(12) United States Patent
Bakal

(10) Patent No.: US 7,859,946 B2
(45) Date of Patent: Dec. 28, 2010

(54) SYSTEM AND A METHOD FOR AN AUTOMATIC PARKING METER

(76) Inventor: Avraham Bakal, 15 Rothschild Street, Tel-Aviv (IL) 66881

( * ) Notice: Subject to any disclaimer, the term of this patent is extended or adjusted under 35 U.S.C. 154(b) by 0 days.

(21) Appl. No.: 12/435,542

(22) Filed: May 5, 2009

(65) Prior Publication Data

US 2009/0213699 A1    Aug. 27, 2009

Related U.S. Application Data

(63) Continuation of application No. PCT/IL2007/001354, filed on Nov. 7, 2007.

(60) Provisional application No. 60/857,499, filed on Nov. 8, 2006.

(51) Int. Cl.
*G04F 8/00* (2006.01)
*G04F 10/00* (2006.01)

(52) U.S. Cl. ............................ 368/7; 368/90

(58) Field of Classification Search ............. 368/7, 368/90, 6, 8, 91–92; 340/932.2; 705/418
See application file for complete search history.

(56) References Cited

U.S. PATENT DOCUMENTS

| | | | | |
|---|---|---|---|---|
| 3,999,372 A * | 12/1976 | Welch et al. | ............ | 368/6 |
| 4,310,890 A * | 1/1982 | Trehn et al. | ............ | 705/418 |
| 4,730,285 A * | 3/1988 | Lie | ............ | 368/90 |
| 4,847,776 A * | 7/1989 | Huang | ............ | 705/418 |
| 4,879,553 A * | 11/1989 | Righi | ............ | 340/932.2 |
| 5,153,586 A * | 10/1992 | Fuller | ............ | 340/932.2 |
| 5,285,425 A * | 2/1994 | Morisawa | ............ | 368/10 |
| 5,309,414 A * | 5/1994 | Chiu | ............ | 368/90 |
| 5,339,000 A | 8/1994 | Bashan | | |
| 5,589,812 A * | 12/1996 | Jones | ............ | 340/309.7 |
| 6,102,285 A | 8/2000 | Elias | | |
| 6,188,328 B1 * | 2/2001 | Ho | ............ | 340/932.2 |
| 6,243,029 B1 * | 6/2001 | Tomer | ............ | 340/932.2 |
| 6,493,676 B1 | 12/2002 | Levy | | |
| 7,014,355 B2 * | 3/2006 | Potter et al. | ............ | 368/90 |

FOREIGN PATENT DOCUMENTS

| | | |
|---|---|---|
| DE | 2513296 | 10/1976 |
| DE | 3235668 | 3/1984 |
| DE | 3829031 | 3/1989 |
| WO | WO 2004/114225 | 12/2004 |

\* cited by examiner

*Primary Examiner*—Vit W Miska
*Assistant Examiner*—Sean Kayes
(74) *Attorney, Agent, or Firm*—The Law Office of Michael E. Kondoudis

(57) ABSTRACT

The present invention is a new and innovative device for regulating parking permits in parking zones in which parking is permitted for short time spans. Embodiments of the present invention enable users to purchase reusable electronic parking devices which display the amount of time remaining for free parking. For instance, in parking zones which allow fifteen minutes of free parking, the device displays 15 min when turned on and counts back the minutes until the time is over. A delaying mechanism inhibits the reactivation of the device for a predetermined time period. Thus, the device ensures that the parking permit is only used for the predetermined time period once since users cannot activate the device sequentially. According to embodiments of the present invention the proposed system and method may be embedded into other time parking devices.

18 Claims, 1 Drawing Sheet

SYSTEM AND A METHOD FOR AN AUTOMATIC PARKING METER

CROSS REFERENCE TO RELATED APPLICATION

This application is a Continuation of International Application No. PCT/IL07/01354, filed Nov. 7, 2007, which is incorporated by reference in its entirety, where the international application claimed the benefit of U.S. Provisional Patent Application 60/857,499, filed Nov. 8, 2006, which is further incorporated herein by reference in its entirety.

BACKGROUND OF THE PRIOR ART

The present invention relates in general to the field of automatic parking meters; more particularly it relates to apparatuses which enable regulating parking permits for short time-spans.

Most metropolitan areas deal with severe shortage in parking spaces, especially in the commercial districts during business hours. For this purpose many municipalities introduced the short-term parking zones in which drivers can park their cars for short time periods, ranging between ten minutes and half an hour. Existing solutions such as parking meters provide only a partial answer to the need to regulate parking in such zones since they do not prevent drivers from renewing or reactivating them sequentially, thereby exceeding the amount of time permitted for parking in the short term parking zone. There is therefore a need for a solution which would enable drivers to park in short-term parking zones but would ensure that they do not exceed the permitted parking time period.

SUMMARY

Disclosed is a device for regulating parking permits for a car in parking zones which limit the allowed parking time. The device comprises a module for measuring the time passed since the car was parked and a reactivation delay module inhibiting the reactivation of the device. The device may also include a display screen for displaying the measured time and control buttons. The control buttons enable users to set the device.

The device may also include a clinging mechanism, which enables the attachment of the device to the windows of the car from the inside. The device may also include an indicator which indicates that the device is in active mode. The indicator may be a light emitting diode (LED).

The reactivation delay module may be an internal timer and reactivation is inhibited for a predetermined time period. The time left before the predetermined time period is over may be indicated on the device. The reactivation delay module may include a motion sensor device allowing the reactivation to occur only after the motion sensor identifies that the car was moved. The reactivation delay module may include a global positioning system (GPS) chip and the reactivation is allowed only if current activation position differs from previous activation position.

The device may be embedded into a second in-vehicle time measuring parking device or into a cellular parking apparatus.

Also disclosed is a method for regulating parking permits for a car in parking zones which limit the allowed parking time. The regulation of parking permits is performed using a dedicated device. The method comprises the steps of measuring the amount of time since activation and delaying reactivation for a predetermined time period after the allowed parking time has passed according to the activation time.

The measured time may be displayed on a display of the device. The measured time may be controlled using control buttons of the device. The time period passed before enabling reactivation of the device may be measured.

According to some embodiments of the present invention the reactivation of the device may be enabled only after a motion sensor device identifies that the car was moved. According to additional embodiments of the present invention the reactivation of the device is enabled only after a global positioning system (GPS) chip identifies that the current activation position differs from the previous activation position.

The method may be embedded into a second in-vehicle time measuring parking device or into a cellular parking apparatus.

BRIEF DESCRIPTION OF THE DRAWINGS

The subject matter regarded as the invention will become more clearly understood in light of the ensuing description of embodiments herein, given by way of example and for purposes of illustrative discussion of the present invention only, with reference to the accompanying drawings, wherein.

Figure 1:
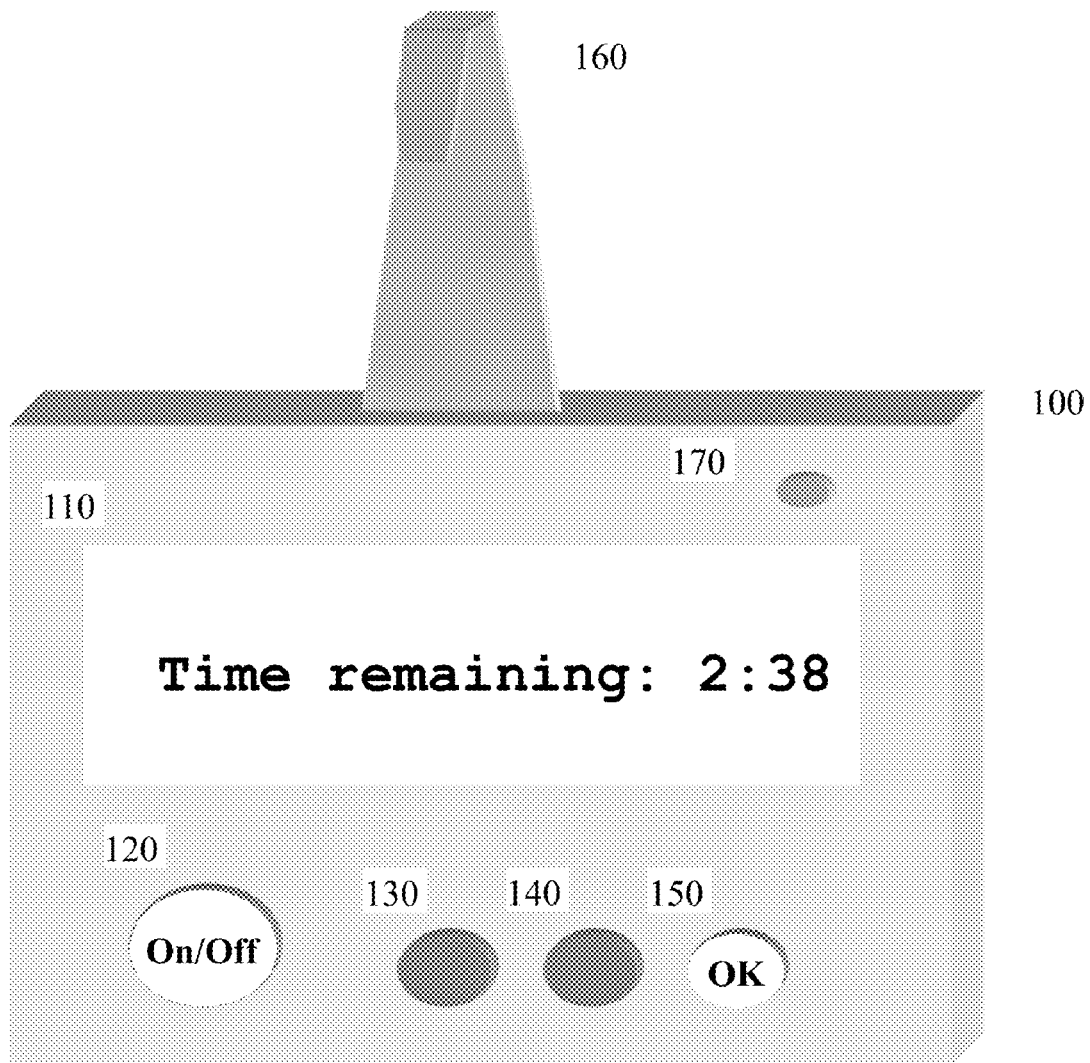
FIG. 1 is a schematic illustration of the parking device in accordance with embodiments of the present invention.

The drawings together with the description make apparent to those skilled in the art how the invention may be embodied in practice.

No attempt is made to show structural details of the invention in more detail than is necessary for a fundamental understanding of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF SOME EMBODIMENTS OF THE INVENTION

The present invention is a new and innovative device for regulating parking permits in parking zones in which parking is permitted for short time spans. Embodiments of the present invention enable users to purchase reusable electronic parking devices which display the amount of time remaining for free parking. For instance, in parking zones which allow fifteen minutes of free parking, the device displays 15 min when turned on and counts back the minutes until the time is over. A delaying mechanism inhibits the reactivation of the device for a predetermined time period. Thus, the device ensures that the parking permit is only used for the predetermined time period once since users cannot activate the device sequentially.

An embodiment is an example or implementation of the inventions. The various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "one embodiment", "an embodiment", "some embodiments" or "other embodiments"

means that a particular feature, structure, or characteristic described in connection with the embodiments is included in at least one embodiments, but not necessarily all embodiments, of the inventions. It is understood that the phraseology and terminology employed herein is not to be construed as limiting and are for descriptive purpose only.

The principles and uses of the teachings of the present invention may be better understood with reference to the accompanying description, figures and examples. It is to be understood that the details set forth herein do not construe a limitation to an application of the invention. Furthermore, it is to be understood that the invention can be carried out or practiced in various ways and that the invention can be implemented in embodiments other than the ones outlined in the description below.

It is to be understood that the terms "including", "comprising", "consisting" and grammatical variants thereof do not preclude the addition of one or more components, features, steps, or integers or groups thereof and that the terms are to be construed as specifying components, features, steps or integers. The phrase "consisting essentially of", and grammatical variants thereof, when used herein is not to be construed as excluding additional components, steps, features, integers or groups thereof but rather that the additional features, integers, steps, components or groups thereof do not materially alter the basic and novel characteristics of the claimed composition, device or method.

If the specification or claims refer to "an additional" element, that does not preclude there being more than one of the additional element. It is to be understood that where the claims or specification refer to "a" or "an" element, such reference is not be construed that there is only one of that element. It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks. The term "method" refers to manners, means, techniques and procedures for accomplishing a given task including, but not limited to, those manners, means, techniques and procedures either known to, or readily developed from known manners, means, techniques and procedures by practitioners of the art to which the invention belongs. The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined. The present invention can be implemented in the testing or practice with methods and materials equivalent or similar to those described herein.

The terms "bottom", "below", "top" and "above" as used herein do not necessarily indicate that a "bottom" component is below a "top" component, or that a component that is "below" is indeed "below" another component or that a component that is "above" is indeed "above" another component. As such, directions, components or both may be flipped, rotated, moved in space, placed in a diagonal orientation or position, placed horizontally or vertically, or similarly modified. Accordingly, it will be appreciated that the terms "bottom", "below", "top" and "above" may be used herein for exemplary purposes only, to illustrate the relative positioning or placement of certain components, to indicate a first and a second component or to do both.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

FIG. 1 is a schematic illustration of the parking device in accordance with embodiments of the present invention. Parking device 100 is comprised of display screen 110, on/off button 120, control buttons 130-150 and hanging means 160. In order to operate parking device 100 the user first parks the car in a parking zone in which parking is only permitted for limited time spans. The driver then activates device 100 by pressing the on/off button 120. Display screen 110 then displays the option screen. The option screen may allow users to determine the time limit of the parking zone in which they parked, the code of the parking zone or any other information relevant for operating the parking device. For instance, if different time limitations are relevant for different parking zones, the user may select the appropriate time zone category, the code of the particular parking zone or simply select the permitted time limit. The user controls the input to the options screen using control buttons 130-150. Up button 130 and down button 140 enable the user to flip through the options in the options screen and select button 150 enables the user to select the appropriate option.

Having selected the appropriate options the user activates the parking device and positions it inside the car in a place where it could be seen from the outside. According to one embodiment, the device includes hanging means 160 which enable hanging the device on the roll-down windows, either on the side of the driver or on the side of the passenger. Hanging means 160 is an elastic hook which may be placed on top of a roll-down window when it is partially opened. The device is secured into place when the window is then rolled up to full closure and hanging means are held between the top of the window and the window frame.

According to an additional embodiment of the present invention the device may be displayed on one of the windows of the car using any type of clinging mean such as window suction cups or by using a sticker. According to yet another embodiment of the present invention the device itself is integrated into a sticker.

After the user activates the device 100, display screen 110 displays the time remaining for parking or the time passed since the device was activated. After the predetermined time has passed display 110 displays a message saying that the time for parking is over. Alternatively, device 100 may display the hour in which the device was activated or the time until which the car is permitted to park.

According to some embodiments of the present invention the device also includes indicator 170. For instance, indicator 170 may be a Light Emitting Diode (LED) which emits light or flashes while the device is active and the permitted time for parking has not run out. According to additional embodiments, indicator 170 may operate in more than one state indicating whether the time on the timer is about to run out. Thus, indicator 170 may flash at a moderate rate when device 100 is activated and increase the flashing rate significantly as the time on the timer is about to run out.

According to some embodiments of the present invention the device may include a delay mechanism, in order to prevent users to indefinitely extend their parking permit over long periods of time. The delay mechanism inhibits the user from reactivating the device for a preprogrammed time period after using the device. Thus, the device does not enable its sequential reactivation. For instance, the device may be preprogrammed to wait fifteen minutes before allowing its reactivation. According to some embodiments the time remaining until the next reactivation is allowed may be displayed on screen 110.

According to other embodiments of the present invention the device may include a motion sensor which detects the movement of the car. According to this embodiment the device can be activated only after it has sensed that the car was in motion since its last activation. This mechanism ensures that the device was not activated more than once while parking in the same spot.

According to yet another embodiment of the present invention device 100 may include a global positioning system (GPS) chip and an internal memory chip. Each time device 100 is activated, the position of the device is recorded in the internal memory chip. Device 100 does not allow its activation if the previous activation occurred in the same position as recorded by the GPS chip.

According to additional embodiments of the present invention the device is not comprised of a digital time counting apparatus, but is comprised of a mechanical sand clock. The two sections of the sand clock are marked so as they could be distinguished from one another. The progress of the sand in the sand clock indicates that the parking time was not yet terminated, but in order to be valid the sand must pour from the section marked as the correct one, in order to reactivate the clock the user must turn the sand clock upside-down and wait for the clock to reset itself. Thus, users cannot immediately and sequentially reactivate the clock.

According to embodiments of the present invention the above described mechanism may be integrated into any other type of parking methods and devices. For instance, the disclosed system and method may be integrated into digital in-vehicle parking devices which are known in the art.

The proposed system and method may also be integrated into cellular parking solutions. According to embodiments of the present invention a cellular parking solution enables users to receive a parking permit for a short time period, such as fifteen minutes. After the predetermined time period is terminated, a delaying mechanism is activated and does not allow users to reactivate the cellular parking permit for a predetermined time.

While the invention has been described with respect to a limited number of embodiments, these should not be construed as limitations on the scope of the invention, but rather as exemplifications of some of the embodiments. Those skilled in the art will envision other possible variations, modifications, and applications that are also within the scope of the invention. Accordingly, the scope of the invention should not be limited by what has thus far been described, but by the appended claims and their legal equivalents. Therefore, it is to be understood that alternatives, modifications, and variations of the present invention are to be construed as being within the scope and spirit of the appended claims.

What is claimed is:

1. A device for regulating parking permits for a car in free of charge parking zones which limit the allowed parking time, said device comprising:

a module for enabling activation of said device, when parking said car and measuring the time passed since activation and for limiting the parking time in the parking zone for an allowed predefined time period, wherein said module enables deactivating said device once said predefined time period is over;

a reactivation delay module inhibiting the reactivation of said device for a predefined inhibition time period continuously following the allowed predefined time period, wherein said reactivation of said device is only enabled by said reactivation delay module once said predefined inhibition time period has passed, wherein these modules prevent continuous parking over a predefined time period; and wherein said reactivation delay module includes a motion sensor device allowing said reactivation to occur only after said motion sensor identifies that said car was moved.

2. The device of claim 1 further including a display screen for displaying said measured time.

3. The device of claim 1 further including control buttons, wherein said control buttons enable users to set the device.

4. The device of claim 1 further including a clinging mechanism, wherein said clinging mechanism enables the attachment of said device to the windows of said car from the inside.

5. The device of claim 1 further including an indicator, wherein said indicator indicates that said device is in active mode.

6. The device of claim 5 wherein said indicator is a light emitting diode (LED).

7. The device of claim 6 wherein the time left before said predetermined time period is over is indicated on said device.

8. The device of claim 1 wherein said reactivation delay module includes an internal timer and reactivation is inhibited for a predetermined time period.

9. The device of claim 1 wherein said reactivation delay module includes a global positioning system (GPS) chip and said reactivation is allowed only if current activation position differs from previous activation position.

10. The device of claim 1 wherein said device is embedded into a second in-vehicle time measuring parking device.

11. The device of claim 1 wherein said device is embedded into a cellular parking apparatus.

12. A method for regulating parking permits for a car in parking zones which limit the allowed parking time, wherein said regulation of parking permits is performed using a dedicated device, said method comprising:

measuring the amount of time since activation;

deactivating said device when said measured time exceeds a predefined time period;

delaying reactivation for a predetermined inhibition time period after said deactivation, according to said predetermined activation time period; and enabling the reactivation of said device only after a motion sensor device identifies that said car was moved.

13. The method of claim 12 further including the step of displaying said measured time on a display of said device.

14. The method of claim 12 further including the step of controlling said measured time using control buttons of said device.

15. The method of claim 12 further including the step of measuring the time period passed before enabling reactivation of said device.

16. The method of claim 12 further including the step of enabling the reactivation of said device only after a global positioning system (GPS) chip identifies that current activation position differs from previous activation position.

17. The method of claim 12 wherein said method is embedded into a second in-vehicle time measuring parking device.

18. The method of claim 12 wherein said method is embedded into a cellular parking apparatus.

* * * * *